US012784638B2

(12) United States Patent
Kim et al.

(10) Patent No.: US 12,784,638 B2
(45) Date of Patent: Nov. 3, 2026

(54) SEMICONDUCTOR DEVICE FOR DRIVING A DISPLAY AND A DISPLAY DRIVING DEVICE INCLUDING THE SAME

(71) Applicant: LX SEMICON CO., LTD., Daejeon (KR)

(72) Inventors: Joon Sung Kim, Daejeon (KR); Cheong Sik Yu, Daejeon (KR); Kee Joon Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/057,560

(22) Filed: Feb. 19, 2025

(65) Prior Publication Data

US 2025/0265963 A1 Aug. 21, 2025

(30) Foreign Application Priority Data

Feb. 20, 2024 (KR) ........................ 10-2024-0024602

(51) Int. Cl.
*G09G 3/20* (2006.01)

(52) U.S. Cl.
CPC ... *G09G 3/2092* (2013.01); *G09G 2310/0267* (2013.01); *G09G 2330/028* (2013.01)

(58) Field of Classification Search
CPC ......... G09G 3/2092; G09G 2310/2067; G09G 2330/028
See application file for complete search history.

(56) References Cited

U.S. PATENT DOCUMENTS

| | | | | |
|---|---|---|---|---|
| 2011/0073942 A1* | 3/2011 | Banerjee | H10D 30/603 257/E29.256 |
| 2019/0080976 A1* | 3/2019 | Kudou | H10D 62/112 |
| 2023/0061900 A1* | 3/2023 | Wu | H10D 30/65 |
| 2023/0170417 A1* | 6/2023 | Park | H10D 30/655 257/336 |

FOREIGN PATENT DOCUMENTS

| | | | |
|---|---|---|---|
| CN | 115566051 A * | 1/2023 | H10D 30/668 |

OTHER PUBLICATIONS

English translation of CN115566051A (Year: 2023).*

* cited by examiner

*Primary Examiner* — Lixi C Simpson
(74) *Attorney, Agent, or Firm* — ROTHWELL, FIGG, ERNST & MANBECK, P.C.

(57) ABSTRACT

A semiconductor device for driving a display according to the embodiment may include a first conductivity type base layer, a second conductivity type doping area on the first conductivity type base layer, a source area on the second conductivity type doping area, a drain area on the first conductivity type base layer, a gate insulating film disposed between the source area and the drain area, a gate electrode disposed on the gate insulating film and one or more device isolating areas disposed on the base layer. The active area including the second conductivity type doping area and the source area may include an active corner cut area in a corner area facing the drain area.

20 Claims, 4 Drawing Sheets

SEMICONDUCTOR DEVICE FOR DRIVING A DISPLAY AND A DISPLAY DRIVING DEVICE INCLUDING THE SAME

CROSS-REFERENCE TO RELATED APPLICATIONS

The present application claims the benefits of priority to Korean Patent Application No. 10-2024-0024602, filed on Feb. 20, 2024, which is incorporated herein by reference in its entirety.

TECHNICAL FIELD

An embodiment relates to a semiconductor device for driving a display and a display driving device including the same. For example, the embodiment may relate to a high voltage (HV) MOSFET semiconductor device for driving a display, but is not limited thereto.

BACKGROUND

A display driver integrated circuit DDIC for driving the display panel may be connected to the display panel.

The display driver integrated circuit (DDIC) uses a medium voltage (MV) semiconductor device or a high voltage (HV) semiconductor device for panel control.

FIG. 1 is a partial cross-sectional photograph of a high voltage (HV) MOSFET device according to the prior art.

In the active corner of a conventional high-voltage (HV) MOSFET structure, a gate oxide thinning (TT) occurs, which makes it difficult to manage a process for leakage and breakdown voltage distribution characteristics of semiconductor devices.

As a result, there is a problem of difficulty in securing reliability during TDDB (time dependent dielectric breakdown) testing.

In particular, due to a recent ultra-miniaturization of semiconductor processes, ultra-fine CMOS transistors of 28 nm or less from the existing 40 nm are being adopted, and along with this, a thickness of the gate oxide is also becoming thinner. Accordingly, the reliability of semiconductor devices becomes more vulnerable due to acceleration of gate oxide thinning due to electric field concentration at the active corner.

SUMMARY

One of the technical objects of the embodiment is to improve the breakdown voltage distribution characteristics by improving leakage in a classic semiconductor device.

A semiconductor device for driving a display according to the embodiment may include a first conductivity type base layer 205, a second conductivity type doping area 207 disposed on the first conductivity type base layer 205, a source area 210 disposed on the second conductivity type doping area 207, a drain area 220 disposed on the first conductivity type base layer 205, a gate insulating film 232 disposed between the source area 210 and the drain area 220, a gate electrode 230 disposed on the gate insulating film 232 and one or more device isolating areas 250 disposed on the base layer 205.

The active area 200A including the second conductivity type doping area 207 and the source area 210 may include an active corner cut area 200AC in the corner area facing the drain area 220.

The active area 200A may include a first active area 200A1 at the center of the gate electrode 230 and a second active area 200A2 outside where the active corner cut area 200AC is located, and a width Wa1 of the first active area 200A1 at the center may be larger than the width Wa2 of the second active area 200A2 at the outside.

The active corner cut area 200AC may include a right-angled triangle shape.

The active corner cut area 200AC may include a first active corner cut area disposed at an upper edge of the second active area 200A2 facing the drain area 220, and a second active corner cut area disposed at a lower edge of the second active area 200A2 facing the drain area 220.

In the embodiment, a distance from the first active area 200A1 at the center to the drain area 220 may be shorter than a distance from the second active area 200A2 at the outside to the drain area 220.

In the embodiment, a distance from the first active area 200A1 in the center to the outside of the gate electrode in the direction of the drain area 220 may be shorter than a distance from the outer second active area 200A2 to the gate electrode in the drain area 220

The active corner cut area 200AC may include a first side (a) of the active corner cut area 200AC and a second side (b) perpendicular thereto.

A length of the first side (a) and a length of the second side (b) may be the same.

The active area 200A may not include an active corner cut area in the corner area facing the source area 210.

Also, a semiconductor device for driving a display according to the embodiment may include a first conductivity type base layer, a second conductivity type doping area disposed on the first conductivity type base layer, a source area disposed on the second conductivity type doping area, a drain area disposed on the first conductivity type base layer, a gate insulating film disposed between the source area and the drain area, a gate electrode disposed on the gate insulating film. And the second conductivity type doping area may include an active corner cut area in a corner area facing the drain area in a plan view.

Also, an active area may include the second conductivity type doping area and the source area and the active area may include a first active area at a first region vertically overlapping the gate electrode and a second active area at a second region laterally overlapping the active corner cut area.

Also, a lateral width of the first active area may be larger than a lateral width of the second active area.

Also, the active corner cut area may include a first active corner cut area disposed at an upper edge of the second active area facing the drain area, and a second active corner cut area disposed at a lower edge of the second active area facing the drain area.

Also, a distance from the first active area to the drain area may be shorter than a distance from the second active area to the drain area.

Also, a distance from the first active area to the outside of the gate electrode in a direction of the drain area may be shorter than a distance from the second active area to the gate electrode in a direction of the drain area.

Also, the active corner cut area may include a right-angled triangle shape.

Also, the active corner cut area may include a first side and a second side perpendicular to the first side of the active corner cut area, and a length of the first side and a length of the second side may be the same.

Also, the active area may not include the active corner cut area in the corner area facing the source area.

The display driving device according to the embodiment may include any of the semiconductor devices for driving the display.

According to the embodiment, the gate oxide thinning can be improved by blocking electric field concentration through an active corner cut in a classic semiconductor device. Accordingly, the embodiment has the technical effect of improving breakdown voltage distribution characteristics by improving leakage characteristics in a classic semiconductor device.

DETAILED DESCRIPTION

Figure 1:
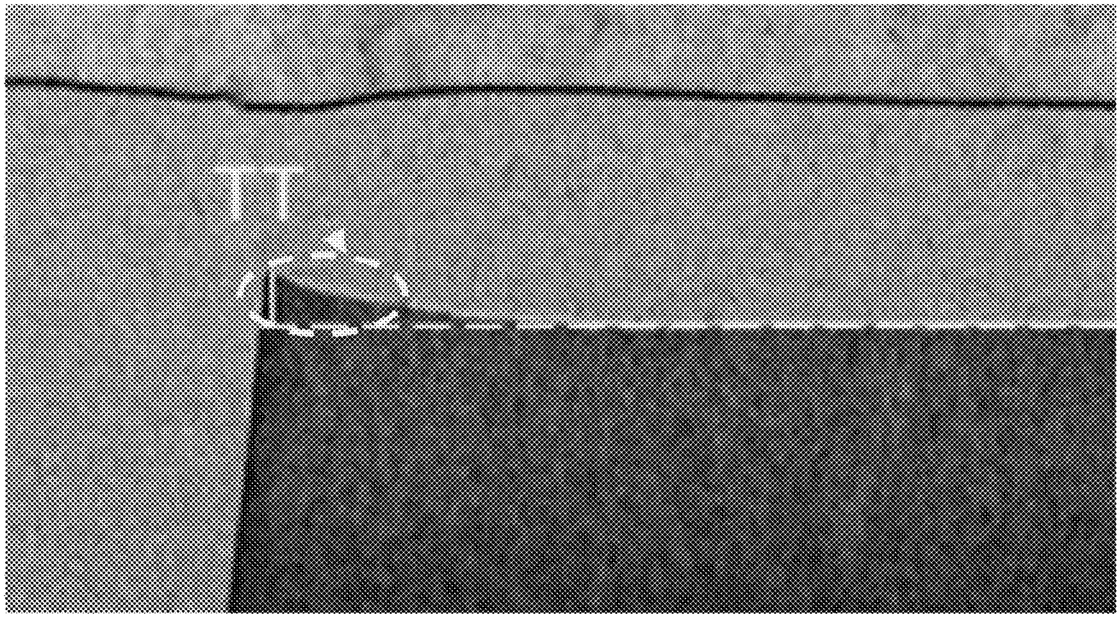
FIG. 1 is a partial cross-sectional photograph of a high voltage (HV) MOSFET device according to the prior art.

Hereinafter, embodiments disclosed in the present specification will be described in detail with reference to the attached drawings, but identical or similar components will be assigned the same reference numbers regardless of the reference numerals, and duplicate descriptions thereof will be omitted. The suffixes 'module' and 'part' for components used in the following description are given or used interchangeably in consideration of ease of specification preparation, and do not have distinct meanings or roles in themselves. Additionally, the attached drawings are intended to facilitate easy understanding of the embodiments disclosed in this specification, and the technical idea disclosed in this specification is not limited by the attached drawings. Additionally, when an element such as a layer, region or substrate is referred to as being 'on' another component, this includes either directly on the other element or there may be other intermediate elements in between.

Embodiment

Figure 2A:
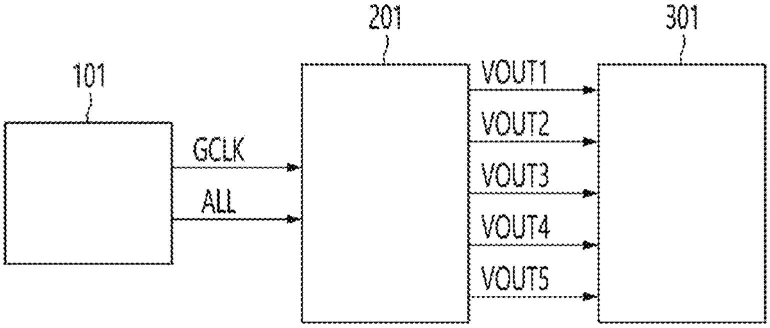
FIG. 2A is an exemplary configuration diagram of a display system to which a display driving device according to an embodiment is applied.
Figure 2B:
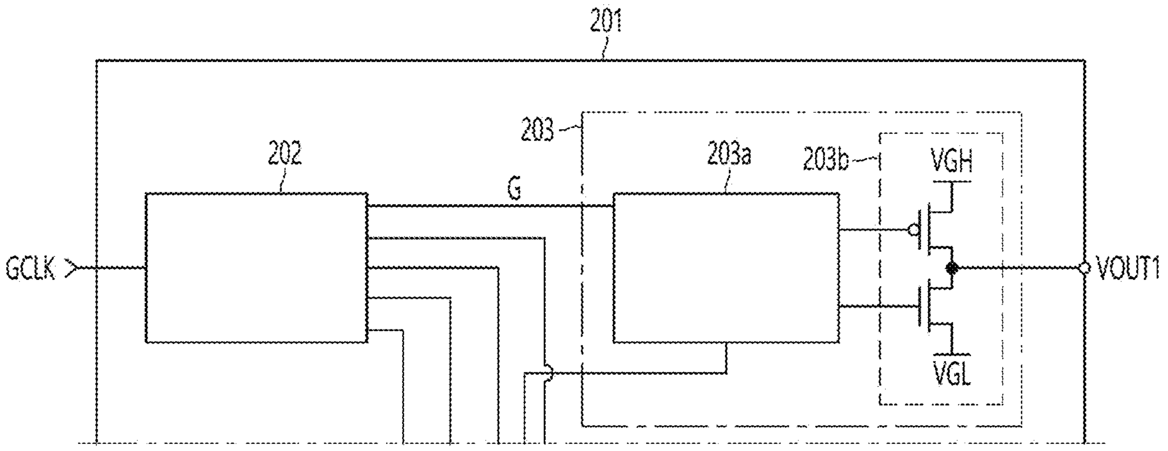
FIG. 2B is a partial block diagram of a gate driver according to an embodiment.

FIG. 2A is an exemplary configuration diagram of a display system to which a display driving device according to an embodiment is applied, and FIG. 2B is a partial block diagram of a gate driver according to the embodiment.

Referring to FIG. 2A, a display system to which a display driving device according to the embodiment is applied may include a timing controller 101, a gate driver 201, a source driver (not shown), and a display panel 301.

The gate driver 201 may receive the gate clock signal GCLK and control signal ALL from the timing controller 101 and provide gate driving signals (VOUT1 to VOUT5) to the display panel 301.

The timing controller 101 may provide a control signal and a gate clock signal GCLK to control the operation of the gate driver 201. The control signal may include a gate enable signal for enabling the operation of the gate driver 201 or a control signal ALL for a power down mode, but is not limited thereto.

The display panel 301 may be a variety of flat display panels, such as a liquid crystal display panel, a light emitting diode display panel, and an organic light emitting diode display panel.

Additionally, the display system of the embodiment may include devices such as a source driver (not shown) and a power supply (not shown). The source driver may provide a source driving signal corresponding to data provided from the timing controller 101 to the display panel 301. And, the power supply unit may provide voltages necessary for the operation of the timing controller 101, gate driver 201, and source driver.

Next, referring to FIG. 2B, the gate driver 201 of the embodiment may include a gate signal processing unit 202, a control unit (not shown), and an output circuit 203.

The gate signal processing unit 202 may receive the gate clock signal GCLK provided from the timing controller 101 and may output a gate signal G corresponding to the gate driving signal VOUT1 to be provided to the display panel 301.

The control unit may receive the control signal ALL and generate driving control signals having a time difference in activation time in response to the control signal ALL, but is not limited thereto.

Next, each output circuit 203 may include a level shifter 203*a* and an output buffer 203*b*, and may be configured in numbers corresponding to the output channels of the gate driver 201. The output circuits 203 may respectively receive a gate signal G and a driving control signal ALL, and output gate driving signals VOUT1 to VOUT5, respectively.

At this time, the level shifter 203*a* may compensate the level of the gate signal G in response to the inactive driving control signal ALL, may provide a gate signal G with compensated level to output buffer 203*b*. And the level shift 203*a* may perform an inverter operation for input, but is not limited to this.

As previously described, the display driver integrated circuit DDIC according to the embodiment may use a medium voltage MV semiconductor device or a high voltage HV semiconductor device such as TFT for panel control.

For example, the output buffer 203*b* of the embodiment may include a PMOS transistor and an NMOS transistor, and may have a configuration in which the drains of the PMOS transistor and the NMOS transistor are commonly connected. Accordingly, the output buffer 203*b* may be configured as a buffer composed of a CMOS transistor. And, in the output buffer 203*b*, a gate high voltage VGH may be applied to the PMOS transistor and a gate low voltage VGL may be applied to the NMOS transistor.

Additionally, a node where the drains of the PMOS transistor and the NMOS transistor of the output buffer 203*b* are commonly connected may form an output terminal that outputs the gate driving signal VOUT1.

By the above structure, the output buffer 203*b* may output a gate high voltage VGH when a low level signal is output from the level shifter 203*a*, and may output a gate low voltage VGL when a high level signal is output from the level shifter 203*a*.

Meanwhile, one of the technical objects of the embodiment is to improve the breakdown voltage distribution characteristics by improving leakage in a high-voltage semiconductor device.

As ultra-fine CMOS transistors of 28 nm or less is adopted due to the recent ultra-miniaturization of semiconductor processes, the thickness of the gate oxide becomes thinner. So, there is a problem in securing the reliability of high-voltage semiconductor devices due to gate oxide thinning due to electric field concentration at the active corner.

Figure 3:
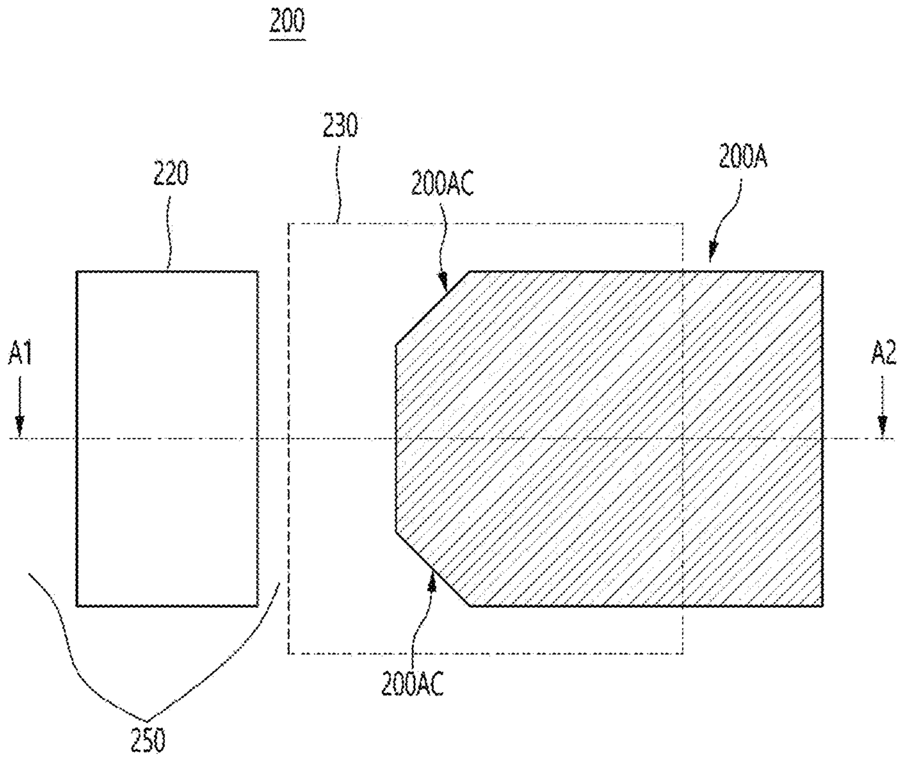
FIG. 3 is a plan view of a semiconductor device 200 for driving a display according to an embodiment.
Figure 4:
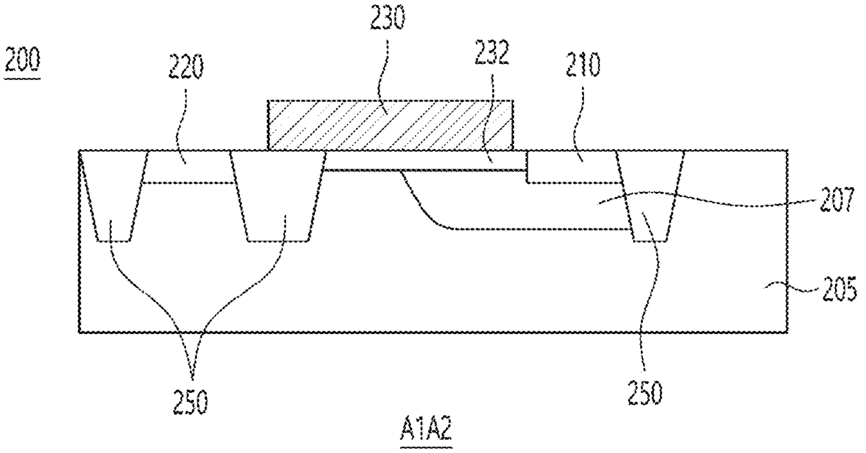
FIG. 4 is a cross-sectional view taken along line A1-A2 of the semiconductor device 200 for driving a display according to the embodiment shown in FIG. 3.
Figure 5:
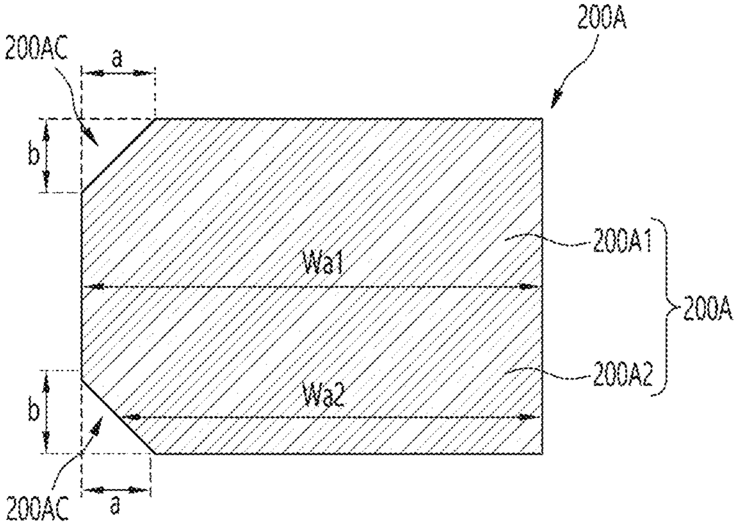
FIG. 5 is an enlarged view of the active area 200A of the semiconductor device 200 for driving a display according to the embodiment shown in FIG. 3.

FIG. 3 is a plan view of a semiconductor device 200 for driving a display according to an embodiment, FIG. 4 is a cross-sectional view taken along line A1-A2 of the semiconductor device 200 for driving a display according to the embodiment shown in FIG. 3, and FIG. 5 is an enlarged view of the active area 200A of the semiconductor device 200 for driving a display according to the embodiment shown in FIG. 3.

First, referring to FIG. 4, the semiconductor device 200 for driving a display according to an embodiment may include a first conductivity type base layer 205, a second conductivity type doping area 207 disposed on the first conductivity type base layer 205, a source area 210 disposed on the second conductivity type doping area 207, a drain area 220 disposed on the first conductivity type base layer 205, a gate insulating film 232 disposed between the source area 210 and the drain area 220, and a gate electrode 230 disposed on the gate insulating film 232. And a device isolating area 250 may be disposed on the base layer 205.

The semiconductor device 200 for driving a display according to the embodiment may be a MOSFET with an asymmetric structure, but is not limited thereto.

Referring to FIGS. 3 and 5, the semiconductor device 200 for driving a display according to the embodiment may include an active area 200A including the second conductivity type doping area 207 and the source area 210.

Additionally, the semiconductor device 200 for driving a display according to the embodiment may include an active corner cut area 200AC in the active area 200A in a plan view.

The active corner cut area 200AC may have a right-angled triangle shape, but is not limited thereto. For example, the active corner cut area 200AC may include a first side a and a second side b perpendicular to it. The length of the first side a and the length of the second side b may be the same, but are not limited thereto. The length of the first side a and the second side b may each be 1 μm or less, but are not limited thereto.

In addition, in the semiconductor device 200 for driving a display according to the embodiment, the active area 200A may include a first active area 200A1 at the center of the gate electrode 230 and a second active area 200A2 outside where the active corner cut area 200AC is located.

In the embodiment, a width Wa1 of the first active area 200A1 in the center may be larger than the width Wa2 of the second active area 200A2 on the outside.

In the embodiment, the difference between the width Wa1 of the first active area 200A1 in the center and the width Wa2 of the second active area 200A2 on the outside may not result in an actual increase in operating voltage.

According to the embodiment, by providing an active corner cut area 200AC in the active area 200A in a high voltage semiconductor device, gate oxide thinning can be improved by blocking electric field concentration in the corner area. Accordingly, the embodiment has the technical effect of improving breakdown voltage distribution characteristics by improving leakage characteristics in a high-voltage semiconductor device.

Figure 6:
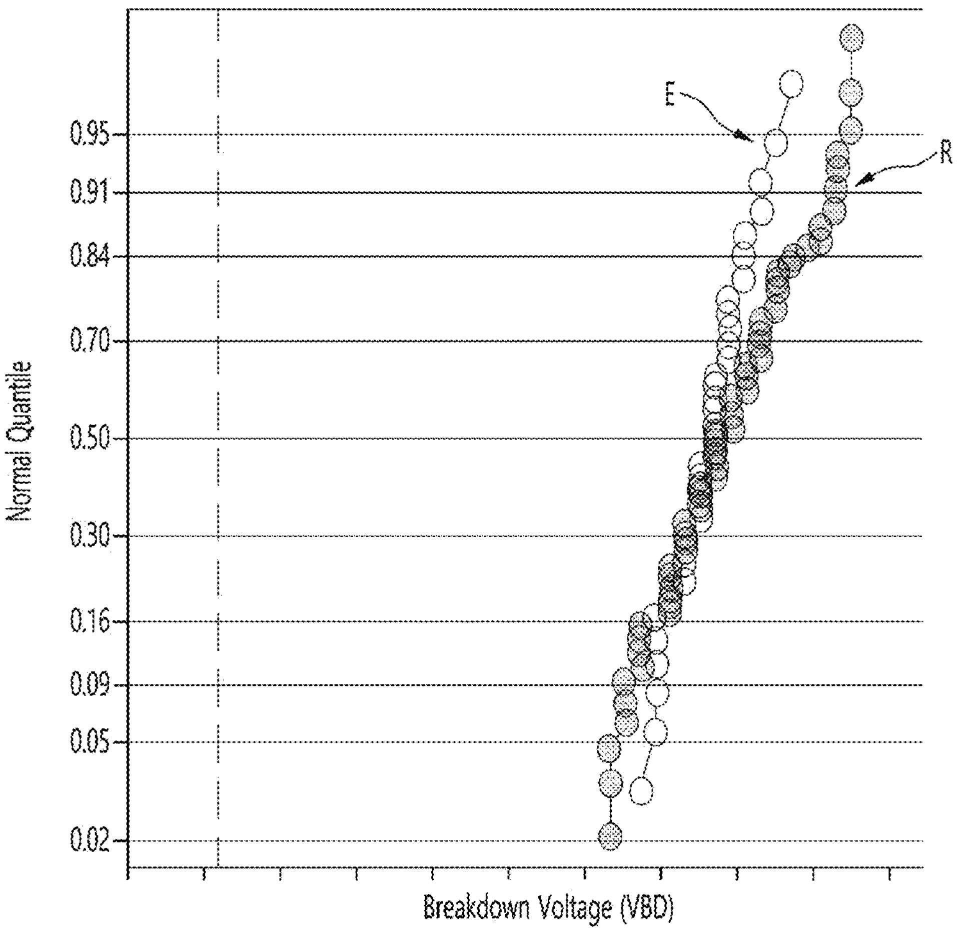
FIG. 6 shows comparative data of the breakdown voltage distribution characteristic (E) of the semiconductor device 200 for driving a display according to the embodiment and the breakdown voltage distribution characteristic (R) of the comparative example.

For example, FIG. 6 shows data on the breakdown voltage distribution characteristic E of the semiconductor device 200 for driving a display according to the embodiment and the breakdown voltage distribution characteristic R of the comparative example.

According to embodiment E, compared to comparative example R, by providing an active corner cut area 200AC in the active area 200A, there is a technical effect of improving leakage distribution characteristics in a high-voltage semiconductor device by blocking electric field concentration at the corner.

According to an embodiment, gate oxide thinning can be improved by blocking electric field concentration through an active corner cut in a classic semiconductor device. Accordingly, the embodiment has the technical effect of improving breakdown voltage distribution characteristics by improving leakage characteristics in a classic semiconductor device.

Although the above description focuses on embodiments, this is only an example and does not limit the embodiments, so those of ordinary skill in the field to which the embodiment belongs will recognize that various modifications and applications not exemplified above are possible without departing from the essential characteristics of the present embodiment. For example, each component specifically shown in the examples can be modified and implemented. And these variations and differences related to application should be interpreted as being included in the scope of the embodiments set forth in the appended claims.

What is claimed is:

1. A semiconductor device for driving a display, comprising:

a first conductivity type base layer;

a second conductivity type doping area disposed on the first conductivity type base layer;

a source area disposed on the second conductivity type doping area;

a drain area disposed on the first conductivity type base layer;

a gate insulating film disposed between the source area and the drain area;

a gate electrode disposed on the gate insulating film; and one or more device isolating areas disposed on the first conductivity type base layer;

wherein an active area having the second conductivity type doping area and the source area comprises an active corner cut area in a corner area facing the drain area.

2. The semiconductor device according to claim 1, wherein the active area comprises a first active area at a center of the gate electrode and a second active area at the active corner cut area.

3. The semiconductor device according to claim 2, wherein a width of the first active area is larger than a width of the second active area.

4. The semiconductor device according to claim 2, wherein the active corner cut area comprises a first active corner cut area disposed at an upper edge of the second active area facing the drain area, and a second active corner cut area disposed at a lower edge of the second active area facing the drain area.

5. The semiconductor device according to claim 2, wherein a distance from the first active area to the drain area is shorter than a distance from the second active area to the drain area.

6. The semiconductor device according to claim 2, wherein a distance from the first active area to an outside of the gate electrode in a direction of the drain area is shorter than a distance from the second active area to the gate electrode in the direction of the drain area.

7. The semiconductor device according to claim 1, wherein the active corner cut area comprises a right-angled triangle shape.

8. The semiconductor device according to claim 7, wherein the active corner cut area comprises a first side and a second side perpendicular to the first side of the active corner cut area, and wherein a length of the first side and a length of the second side are the same.

9. The semiconductor device according to claim 1, wherein the active area does not comprise the active corner cut area in a corner area facing the source area.

10. A display driving device comprising the semiconductor device for driving the display according to claim 1.

11. A semiconductor device for driving a display, comprising:

a first conductivity type base layer;

a second conductivity type doping area disposed on the first conductivity type base layer;

a source area disposed on the second conductivity type doping area;

a drain area disposed on the first conductivity type base layer;

a gate insulating film disposed between the source area and the drain area; and a gate electrode disposed on the gate insulating film;

wherein the second conductivity type doping area comprises an active corner cut area in a corner area facing the drain area in a plan view.

12. The semiconductor device according to claim 11, wherein an active area comprises the second conductivity type doping area and the source area, and wherein the active area comprises a first active area at a first region vertically overlapping the gate electrode and a second active area at a second region laterally overlapping the active corner cut area.

13. The semiconductor device according to claim 12, wherein a lateral width of the first active area is larger than a lateral width of the second active area.

14. The semiconductor device according to claim 12, wherein the active corner cut area comprises a first active corner cut area disposed at an upper edge of the second active area facing the drain area, and a second active corner cut area disposed at a lower edge of the second active area facing the drain area.

15. The semiconductor device according to claim 12, wherein a distance from the first active area to the drain area is shorter than a distance from the second active area to the drain area.

16. The semiconductor device according to claim 12, wherein a distance from the first active area to an outside of the gate electrode in a direction of the drain area is shorter than a distance from the second active area to the gate electrode in the direction of the drain area.

17. The semiconductor device according to claim 11, wherein the active corner cut area comprises a right-angled triangle shape.

18. The semiconductor device according to claim 17, wherein the active corner cut area comprises a first side and a second side perpendicular to the first side of the active corner cut area, and wherein a length of the first side and a length of the second side are the same.

19. The semiconductor device according to claim 12, wherein the active area does not comprise the active corner cut area in a corner area facing the source area.

20. A display driving device comprising the semiconductor device for driving the display according to claim 11.

* * * * *